Nov. 23, 1948.   R. B. NELSON   2,454,564
IONIZATION TYPE VACUUM GAUGE
Filed April 8, 1947   2 Sheets-Sheet 1

Inventor:
Richard B. Nelson,
by Harry E. Dunham
His Attorney.

Nov. 23, 1948.   R. B. NELSON   2,454,564
IONIZATION TYPE VACUUM GAUGE

Filed April 8, 1947   2 Sheets-Sheet 2

Inventor:
Richard B. Nelson,
by Harry E. Dunham
His Attorney.

Patented Nov. 23, 1948

2,454,564

UNITED STATES PATENT OFFICE 2,454,564

IONIZATION-TYPE VACUUM GAUGE

Richard B. Nelson, Schenectady, N. Y., assignor to General Electric Company, a corporation of New York Application April 8, 1947, Serial No. 740,201

12 Claims. (Cl. 315—369)

This invention relates to methods and apparatus for measuring very low gas pressures, such as those within evacuated chambers, by measurement of an ionization current established within the rarefied atmosphere of the gas. It has for its general object the provision of an improved method and apparatus of increased sensitivity by comparison with prior art ionization type gauges whereby substantially smaller gaseous pressures may be measured or whereby pressures now measurable may be measured with a higher degree of precision. It is a further object of the invention to provide an improved tube construction having features simplified for more convenient and economical manufacture and for operation, for example, simplified operation with respect to the degassing step which is, of course, generally necessary with all gaseous pressure measurements of the type to which the invention pertains.

Figure 1:
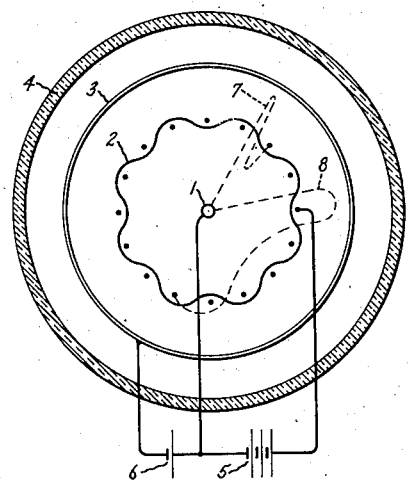
Figure 2:
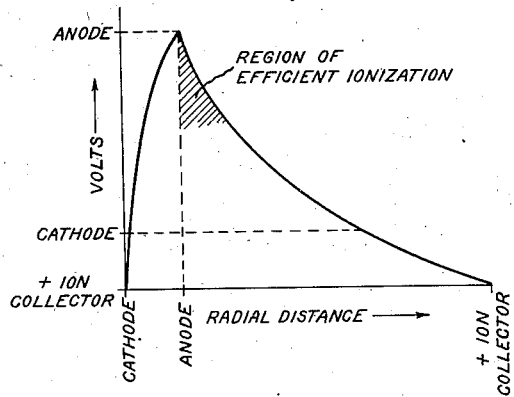
Figure 3:
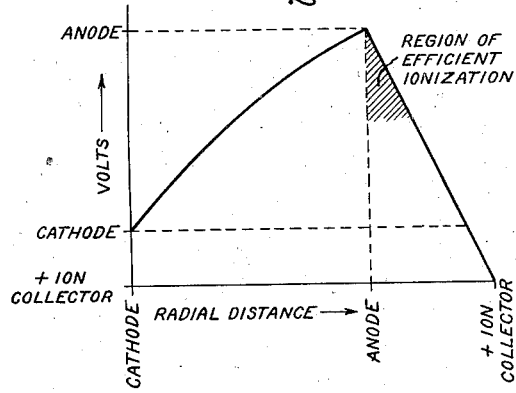
Figure 4:
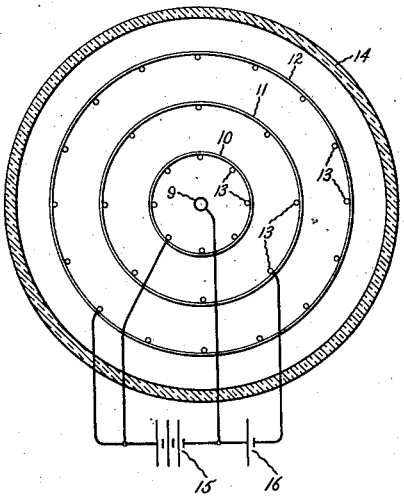
Figure 5:
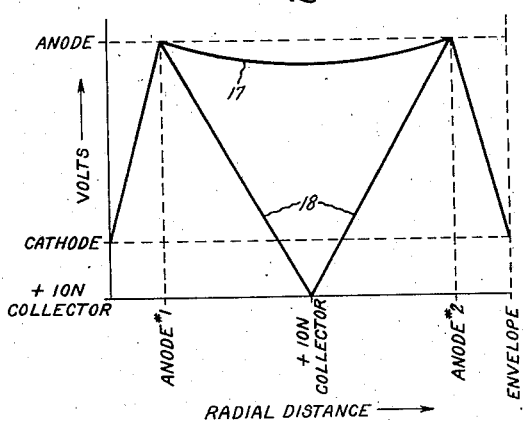
Figure 6:
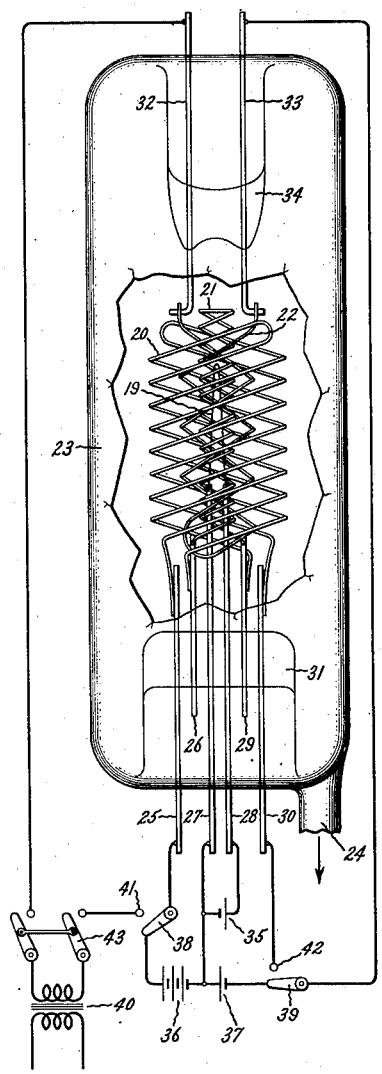
Figure 7:
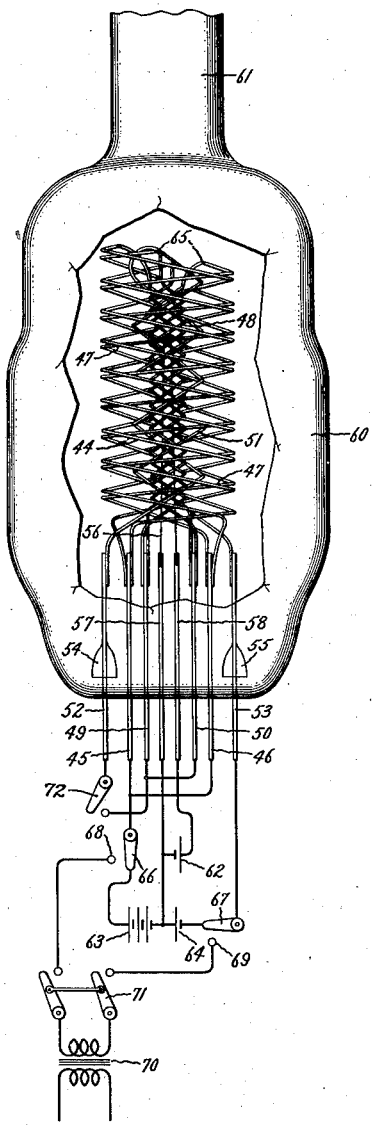

The features of the invention desired to be protected are set forth with particularity in the appended claims. The invention itself together with further objects and advantages thereof may best be understood by reference to the following specification when taken in connection with the accompanying drawings in which Fig. 1 represents schematically an ionization-type vacuum gauge of a type common in the prior art; Figs. 2 and 3 represent graphically certain electrical characteristics of such prior art type gauges; Fig. 4 illustrates schematically the principles of the present invention; Fig. 5 represents graphically certain electrical characteristics of the improved gauge of the invention; Fig. 6 represents a view of a practical ionization gauge tube embodying the principles of the invention together with an operating circuit therefor; while Fig. 7 represents an alternative construction also embodying the principles of the invention together with an operating circuit therefor.

As is well understood in the art to which the invention pertains, very low gas pressures may be measured, in accordance with one customary method, by providing within the gaseous atmosphere a cathode, a positively charged anode arranged to accelerate and collect electrons emitted from the thermionic cathode, and a negatively charged collector electrode arranged to collect positively charged gaseous ions generated by impact of the electrons with gaseous molecules. The total number of ions collected affords a measure of the gas pressure. In a common preferred form of ionization gauge, these electrodes take the form of concentric cylindrical members of which the cathode is the inner member, the collector electrode the outer member and the anode the intermediate member. Constructions of this type have certain inherent limitations as regards their sensitivity and precision of measurement and consequently as regards the lowest possible gas pressure accurately measurable. These limitations may be attributed largely to two facts, first the fact that the positive ions, the total number of which should be maximized in order to provide accurately measurable currents, can be created only within the neighborhood of a relatively small section of the interelectrode space having a potential sufficiently high to impart to electrons velocities high enough to effect impact ionization, and secondly, the fact that the electrons traverse a somewhat limited path before their collection on the anode, thereby minimizing the possibility of impact with a large number of gas molecules. With prior art constructions of the aforesaid nature, the section of high potential interelectrode space is usually confined to a relatively narrow region about the position of the anode and the electron path to a relative short lived oscillatory motion about the anode.

Pursuant to the objects of the present invention the aforesaid limitations are overcome to a substantial degree by providing two positively charged anodes and a negatively charged collector electrode within the interspace between the positively charged anodes. Thereby the volume of space in which sufficiently high ionizing potentials exist is substantially increased while, at the same time, the electrons which generate the ionization current will be afforded a substantially longer mean path in which to encounter a greater number of gas molecules for ionization purposes. Other advantages of this construction from the viewpoint of simplicity of manufacture and operation such as in the degassing step will be discussed hereinafter.

Referring now to the Fig. 1 which illustrates schematically a gauge of the prior art type referred to above, there is shown a thermionic cathode 1, a positively charged anode 2 of open meshed wire, and a negatively charged collector electrode 3 of solid cylindrical metallic construction, all of which are concentrically mounted with respect to each other within any suitable envelope 4. It will be understood that any suitable means may be employed for introducing a sample of the atmosphere to be examined into the envelope 4. Generally, the anode 2 will be operated at several hundred volts positive with respect to the cathode 1 while the collector electrode 3 is operated at a voltage slightly negative with respect thereto in order that it may attract and collect positive ions formed in the gap between the electrodes and yet repel electrons. Batteries 5 and 6 may be provided for the purpose. Because the anode 2 is of an open mesh structure, electrons from the cathode may oscillate in paths through and about the anode structure thereby traversing a relatively elongated path along which they may generate ions within the gas. Typical electron paths are indicated by dotted lines 7 and 8. In operation, ions formed in the space between the cathode 1 and the anode 2 are accelerated toward the cathode and eventually collected by it. Those formed outside the anode tube are accelerated to the collector electrode 3 and this ion current is used as a measure of the gas pressure. In order to prevent or at least to minimize the passage of positive ions to the surface of the envelope 4, it is necessary that the collector electrode 3 be formed as a solid cylinder. Otherwise, a substantial number of positive ions would pass to collection on the envelope wall and thereby detract from the useful indicating current.

At low pressures, the number of positive ions formed is generally directly proportional to a number of factors including the number of electrons emitted from the cathode, the pressure within the gas, the length of the electron path in the gas before they are collected by the anode, and also depends upon the electron velocity throughout their path, the last factor, electron velocity, being of course, dependent upon the potential throughout the region of the path. Any increase in any of these factors will increase the useful ion current and tend to raise it to a more accurately measurable level. The higher the measurable level of the ion current, the lower will be the gas pressure which can be measured. The present invention effects an increase in the last two of these factors in order that the average electron path may be substantially lengthened and the electron velocities throughout that path raised to a value above that necessary to effect efficient ionization by impact.

In the case of the prior art constructions exemplified by Fig. 1, the average electron path may be lengthened by placing the anode 2 close to the cathode 1. However, another factor limits the advantage which can be obtained by so doing. That is the fact that the potential between the anode 2 and the collector electrode 3 falls off logarithmically in such manner that there is only a small volume in the vicinity of the anode wherein the potential is sufficiently high to afford the electrons efficient ion-forming velocity. Thus, as indicated in the self-explanatory graph of Fig. 2 showing the relations between radial distance from the cathode and the potential of the interelectrode region, a grid close to the cathode while increasing the net electron path may actually decrease the portions of the path in which the electrons have sufficient velocity to ionize the gas. Conversely, as indicated in the similar graph of Fig. 3, if the anode be positioned far from the cathode then the efficient ion formation region is likewise small.

By use of the construction of the present invention, it is possible to increase substantially the region of efficient ionization by providing positively charged electrodes at both positions in order to increase the region of high potential space, the collector electrode then being positioned in the region of greatest ion formation, e. g. in between the anodes. Such an arrangement is illustrated schematically in the Fig. 4 in which there is shown a cathode 9, a first positively charged anode 10, a negatively charged collector electrode 11 and a second positively charged anode 12, all of which may, for example, be formed by concentric open mesh wire structures formed by parallel wires 13 and mounted by suitable means within an envelope 14. If the anodes 10 and 12 both be positively charged (e. g. 150 volts) with respect to the cathode as by battery 15, a large portion of the volume in between them may be maintained at a high potential so that the electrons have high speed over long paths. Collector electrode 11 may be negatively charged as by a battery 16 to a potential (e. g. 0 to −20 volts) sufficient to prevent the collection of electrons thereon. If the collector electrode 11 comprises a fairly open wire mesh structure, it will permit ready traversal of the ion-forming electrons through its interstices. With such an open structure the wires forming it will depress the potential only in their immediate vicinities and most electrons will avoid these regions. Thereby, the potential along the path of most of the electrons will always be positive and sufficiently high for ionization purposes. A representative potential distribution of such a configuration of electrodes is shown by the self-explanatory graph of Fig. 5. The potentials along the path of most all electrons (avoiding the collector wires) is shown by the solid line 17 while that along a path close to the collector wires is shown by lines 18.

The anodes 10 and 12 will create in their vicinities potential barriers which ions formed between them cannot cross. All the ions must therefore be repelled to be collected on the collector electrode 11. They cannot proceed either to the envelope 14 or to the cathode 9. Thus, any tendency characteristic of prior art devices for positive ions to travel to the cathode or to the envelope wall thereby detracting from the useful indicating current will be avoided. Moreover, the fact that an anode potential barrier performs the function of keeping the positive ions away from the envelope surface precludes necessity of constructing any of the electrodes in the form of a solid plate as in Fig. 1. All electrodes may, therefore, be constructed in a continuous wire form whereby a heating current may be passed through them for degassing purposes. In the prior art constructions, the solid electrode (such as 3 of Fig. 1) had to be degassed by more inconvenient methods such as by induction heating currents. It is understood, of course, that this degassing operation is one which must be frequently performed during usage and therefore, any structure which simplifies the operation will be more useful. Moreover, it will be understood that open wire mesh structures of this nature are simpler to construct in the manufacturing operation.

Referring now to Fig. 6, there is shown one practical embodiment of the invention comprising a cathode 19, an outer anode 20, an inner anode 21 and a collector electrode 22, all mounted in generally concentric relation with respect to each other within the envelope 23 which may have an opening 24 leading to a vessel or other container (not shown) containing the gas, the pressure of which is to be measured. The anodes 20 and 21 and the cathode 19 may be mounted by any suitable means, such as the lead-in connections 25, 26, 27, 28, 29 and 30, shown as mounted within the stem press 31. As indicated, the outer anode 20 may be formed by a pair of rotating spiral structures each comprising a spirally wound U-shaped length of wire having ends mounted as by welding on the respective lead-in conductors 25, 26, 29 and 30. Similarly, the inner anode 21 may be formed of a continuous spiral wire mounted on lead-in conductors 26 and 29 as by welding the opposite ends of the spiral thereto. It will be observed that thereby the anodes 20 and 21 are effectively connected in electrical series relationship with respect to the lead-in conductors 25 and 30. The collector electrode 22 is formed of spiral coil which may be mounted similarly on lead-in conductors 32 and 33 sealed through the stem press 34 in the opposite end of the envelope 23. One advantage of the particular feature whereby the electrode 22 in this case is mounted from the opposite end of the envelope is the fact that thereby there is provided a long leakage path between the collector electrode 22 and the anodes 20 and 21 over the longitudinal surface of the envelope. This long leakage path, as will be well understood, will minimize any tendency for leakage currents to pass between the respective electrodes and interfere with the measuring operations of the device. The cathode 19 may be heated to the temperature of thermionic emission by any suitable means illustrated generally by the battery 35. Any suitable means such as a battery 36 may be employed for imposing a positive potential on the anodes 20 and 21. Although the various voltages may vary for different conditions, it will be found that a potential of the order of 150 volts will give satisfactory results. Similarly, the collecting electrode 22 may be held at any suitable potential sufficient to insure that no electrons are collected thereon. As an example, a voltage of about 20 volts below the cathode potential will be found to be satisfactory and such may be applied by any suitable means illustrated schematically by the battery 37.

As indicated in the drawing, the batteries 36 and 37 are connected to their respective electrodes through the switches 38 and 39 shown in their closed position. If it be desired to heat the various electrodes in order to degas them when a pressure measurement is desired to be taken, then the respective electrodes may be connected in series through a source of heating current, shown for example, by the transformer 40. As indicated, the switches 38 and 39 may be thrown to their opposite position in which they make contact with the contacts 41 and 42, respectively, thereby connecting all three electrodes, the two anodes and the collector electrode in series. It will be understood that when the switch 43 is closed, a heating current may be caused to pass from the transformer through all three electrodes in series.

Referring now to Fig. 7, there is shown an alternative embodiment of the invention in which the outer anode 44 corresponding to the anode 20 of Fig. 6 may take the form of two pairs of counter-rotating spiral wires each pair supported on respective lead-in wires 45 and 46 as by welding thereto, the wires of both pairs being welded together for rigidity at all their points of intersection 47. The inner anode 48 may take the form of similar counter-rotating spiral wires similarly welded at their intersection points for rigidity and having ends welded to the lead-in conductors 49 and 50 for support. The collector electrode 51 is a self-supporting spiral formed as one of the spiral structures of anode 20 of Fig. 1, that is, as a spirally wound U-shaped length of wire having ends welded to lead-in conductors 52 and 53. In order to increase the leakage path between the various collector and accelerating anodes over the surface of the envelope, there may be provided a pair of inverted cup-shaped glass members 54 and 55 each surrounding one of the lead-in conductors 52 and 53. It will be understood that because of the overlapping configuration of the upper portions of each of these members, it will be relatively difficult for conductive material sputtered from the cathode or from the electrodes themselves to become coated on the glass surface immediately under the overlapping portions. Thereby, at least a portion of the glass surface will remain relatively free of sputtered material and its normal high resistance path will be maintained. As before, the cathode may be formed of the straight wire filament 56 mounted on the lead-in conductors 57 and 58. The envelope 60 may, of course, take any suitable form having a passageway such as a passageway 61 leading to the vessel or other source of the gas pressure of which is to be examined. The filament or cathode may be energized to the temperature of thermionic emission by the battery 62 as in the case of Fig. 6, while the anodes and the collector electrode may be energized by the batteries 63 and 64, respectively, corresponding to 36 and 37 in Fig. 6. It will be observed that the inner spiral anode 48 is conductively connected to the outer spiral anode 44 at the upper point 65 in order to insure that they both remain at the same potential.

Degassing may be accomplished in the manner similar to that discussed in connection with Fig. 6. Normally, the switches 66 and 67 are closed in the position indicated in order to connect the batteries to their respective anodes and electrode. However, for the degassing operation, these switches are changed to make contact with the contacts 68 and 69, respectively, thereby connecting the heating transformer 70 to the ends of the anode 44 and electrode 51. By closing the additional switches 71 and 72, all of the electrodes are connected in series in order that heating current may pass therethrough.

While I have shown and described a particular embodiment of my invention, it will be obvious to those skilled in the art that various changes and modifications may be made without departing from my inventon in its broader aspects and I, therefore, aim in the appended claims to cover all such changes and modifications as fall within the true spirit and scope of my invention.

What I claim as new and desire to secure by Letters Patent of the United States, is:

1. An electrical discharge device for use in determining a property of a gas by establishing ionization currents therein comprising, an envelope having an orifice through which a sample of a gas to be examined is introduced, a plurality of electrodes in said envelope including a cathode, a pair of anodes spaced at different distances from said cathode, an ion-collector electrode between said anodes, and lead-in conductors connected to said electrodes for imposing with respect to said cathode a positive potential on said anodes and a relatively negative potential on said collector electrode.

2. An electrical discharge device as in claim 1 in which said anodes and said collector electrode comprise open wire structures.

3. An electrical discharge device for use in determining a property of a gas by establishing ionization currents therein comprising, an envelope having an orifice through which a sample of a gas to be examined is introduced, a plurality of electrodes in said envelope including a cathode, a pair of anodes surrounding said cathode, an ion-collector electrode between said anodes and surrounding said cathode, and lead-in conductors connected to said electrodes for imposing with respect to said cathode a positive potential on said anodes and a relatively negative potential on said collector electrode.

4. An electrical discharge device as in claim 3 in which said anodes and said collector electrode comprise coiled wire structures.

5. An electrical discharge device for use in determining a property of a gas by establishing ionization currents therein comprising, an envelope having an orifice through which a sample of a gas to be examined is introduced, a plurality of electrodes in said envelope including a cathode, a pair of anodes formed of coiled wires concentric with said cathode, a cylindrical ion-collector electrode formed of coiled wires between said anodes and concentric with said cathode, and lead-in conductors connected to said electrodes for imposing with respect to said cathode a positive potential on said anodes and a relatively negative potential on said collector electrode.

6. An electrical apparatus for use in determining a property of a gas by establishing ionization currents therein comprising, an electrical discharge device including an envelope having an orifice through which a sample of a gas to be examined is introduced, a plurality of electrodes in said envelope including a cathode, a pair of anodes spaced at different distances from said cathode, an ion-collector electrode between said anodes, and means maintaining said anodes at a positive potential and said collector electrode at a negative potential with respect to said cathode.

7. An apparatus as in claim 6 in which said anodes and said collector electrode comprise open wire structures.

8. An electrical apparatus for use in determining a property of a gas by establishing ionization currents therein comprising, an electrical discharge device including an envelope having an orifice through which a sample of a gas to be examined is introduced, a plurality of electrodes in said envelope including a cathode, a pair of anodes surrounding said cathode, an ion-collector electrode between said anodes and surrounding said cathode, and means maintaining said anodes at a positive potential and said collector electrode at a negative potential with respect to said cathode.

9. An apparatus as in claim 8 in which said anodes and said collector electrode comprise open wire structures.

10. An electrical apparatus for use in determining a property of a gas by establishing ionization currents therein comprising, an electrical discharge device including an envelope having an orifice through which a sample of a gas to be examined is introduced, a plurality of electrodes in said envelope including a cathode, a pair of open wire cylindrical anodes concentric with said cathode, an open wire cylindrical ion-collector electrode between said anodes, and means maintaining said anodes at a positive potential and said collector electrode at a negative potential with respect to said cathode.

11. An electrical apparatus for use in determining a property of a gas by establishing ionization currents therein comprising, an electrical discharge device including an envelope having an orifice through which a sample of a gas to be examined is introduced, a plurality of electrodes in said envelope including a cathode, a pair of anodes spaced at different distances from said cathode, an ion-collector electrode between said anodes, said anodes and said collector electrode comprising open continuous wires having ends connected to lead-in conductors of said discharge device to permit a heating current to be passed through said wires for degassing purposes, and circuit means including sources of voltage for imposing with respect to said cathode a positive potential on said anodes and a relatively negative potential on said collector electrode when connected to said lead-in conductors, a source of heating voltage for supplying heating current to said wires when connected to said lead-in conductors, and switching means arranged to selectively connect said sources of voltage and said source of heating voltage to said lead-in conductors.

12. An electrical apparatus for use in determining a property of a gas by establishing ionization currents therein comprising, an electrical discharge device including an envelope having an orifice through which a sample of a gas to be examined is introduced, a plurality of electrodes in said envelope including a cathode, a pair of anodes spaced at different distances from said cathode, an ion-collector electrode between said anodes, said anodes and said collector electrode comprising open continuous wires having ends connected to lead-in conductors of said discharge device to permit a heating current to be passed through said wires in series for degassing purposes, and circuit means including sources of voltage for imposing with respect to said cathode a positive potential on said anodes and a relatively negative potential on said collector electrode when connected to said lead-in conductors, a source of heating voltage connectable to said lead-in conductors for supplying heating current to said wires, in series, and switching means arranged to selectively connect said sources of voltage and said source of heating voltage to said lead-in conductors.

RICHARD B. NELSON.

REFERENCES CITED

The following references are of record in the file of this patent:

UNITED STATES PATENTS

| Number | Name | Date |
|---|---|---|
| 1,844,319 | Hatt | Feb. 9, 1932 |
| 2,073,078 | Smith | Mar. 9, 1937 |
| 2,217,417 | Peterson | Oct. 8, 1940 |
| 2,375,280 | Calbick | May 8, 1945 |
| 2,410,060 | Goodale | Oct. 29, 1946 |